United States Patent [19]

Jabr et al.

[11] Patent Number: 4,837,774

[45] Date of Patent: Jun. 6, 1989

[54] COMMON MIRROR TRIAXIAL RING LASER GYROSCOPE HAVING A SINGLE INTERNAL CATHODE

[75] Inventors: Salim N. Jabr, Woodland Hills; Thomas J. Hutchings, West Hills; Nicholas Koumvakalis, Thousand Oaks, all of Calif.

[73] Assignee: Litton Systems, Inc., Beverly Hills, Calif.

[21] Appl. No.: 183,580

[22] Filed: Apr. 19, 1988

Related U.S. Application Data

[63] Continuation-in-part of Ser. No. 102,216, Sep. 29, 1987.

[51] Int. Cl.$^4$ .............................................. H01S 3/083
[52] U.S. Cl. ...................................... 372/94; 356/350
[58] Field of Search ........................... 372/94; 356/350

[56] References Cited

U.S. PATENT DOCUMENTS

| | | | |
|---|---|---|---|
| 3,868,593 | 2/1975 | Fukuda et al. | 331/94.5 |
| 3,936,767 | 2/1976 | Besson et al. | 331/94.5 |
| 4,007,431 | 2/1977 | Abbink et al. | 331/94.5 |
| 4,012,214 | 3/1977 | Furuse et al. | 65/34 |
| 4,105,954 | 8/1978 | Wang et al. | 331/94.5 |
| 4,122,411 | 10/1978 | Fein et al. | 331/94.5 |
| 4,145,669 | 3/1979 | Babcock et al. | 331/94.5 |
| 4,193,042 | 3/1980 | Wang | 331/945 |
| 4,255,720 | 3/1981 | Wang et al. | 331/94.5 |
| 4,257,014 | 3/1981 | Hattori et al. | 331/94.5 |
| 4,287,484 | 9/1981 | Wang et al. | 331/94.5 |
| 4,380,078 | 4/1983 | Wang et al. | 372/62 |
| 4,397,027 | 8/1983 | Zampiello et al. | 356/350 |
| 4,407,583 | 10/1983 | Simms | 372/94 |
| 4,420,835 | 12/1983 | Hattori et al. | 372/88 |
| 4,434,493 | 2/1984 | Chaffee | 372/86 |
| 4,470,701 | 9/1984 | Smith | 372/103 |
| 4,477,188 | 10/1984 | Stiles | 356/350 |
| 4,575,855 | 3/1986 | Council | 372/87 |
| 4,595,377 | 6/1986 | Norvell | 445/28 |
| 4,656,640 | 4/1987 | Peterson et al. | 372/87 |
| 4,672,623 | 6/1987 | Mellum et al. | 372/87 |
| 4,672,624 | 6/1987 | Ford | 372/87 |

Primary Examiner—Leon Scott, Jr.
Attorney, Agent, or Firm—Roy L. Brown

[57] ABSTRACT

A compact three axis ring laser gyroscope having six laser corner mirrors which are positioned on the faces of a parallelopiped laser block, and method for making. Preferably the laser block is a cube. The laser block has a plurality of conduits therein for defining a plurality of closed laser beam-paths for guiding counterpropagating laser waves. Each laser beam-path has a gain medium therein and is formed to define a sensing axis for detection of rotations of the laser block. A single cathode is positioned inside the laser block, preferably substantially at its geometric center, and a plurality of anodes are mounted to the laser block and spaced apart from the cathode. A ion flow path is formed between each anode and the cathode such that application of a suitable electrical potential difference between the anodes and the cathode produces counterpropagating laser beams in each laser beam-path. The anodes are arranged to eliminate undesired Fresnel-Fizeau phase shifts by ensuring that each of the three ring gyros has two opposing ion flows.

20 Claims, 6 Drawing Sheets

COMMON MIRROR TRIAXIAL RING LASER GYROSCOPE HAVING A SINGLE INTERNAL CATHODE

CROSS-REFERENCES TO RELATED APPLICATIONS

This application is a Continuation in Part of U.S. patent application, Ser. No. 102,216, filed Sept. 29, 1987 by Salim N. Jabr and Thomas J. Hutchings for a COMMON MIRROR TRIAXIAL RING LASER GYROSCOPE HAVING SINGLE INTERNAL CATHODE.

BACKGROUND OF THE INVENTION

This invention relates generally to rotation sensing and particularly to ring laser gyroscope rotation sensors having three mutually perpendicular sensing axes. It is also a feature of this invention to offer electrode arrangements for triaxial ring laser gyroscopes having a plurality of anodes and a common cathode for applying electrical energy to the gain medium. It is likewise a feature of this invention to offer specific embodiments of cathodes internal of a ring laser block.

A ring laser gyroscope employs the Sagnac effect to detect rotation. Counter propagating laser beams in a closed path have light frequencies whose difference is directly proportional to the rotation rate of the path about a predetermined axis enclosed by the path. Such axis, when the beam-path is planar, is perpendicular to the plane of the beam-path. The ring laser gyroscope has two counterpropagating beams traversing a closed path. As the path is rotated about a sensing axis, the wave length of one of the beams increases while that of the other decreases. The difference in frequency or beat frequency is a measure of the angular velocity of the gyroscope about that sensing axis. The output beams from the two directions interfere to produce fringes which are measures of the beat frequency. The high optical frequencies of the beams ($10^{15}$ Hz) preclude the direct measure to the required accuracy of the optical frequencies.

Three ring laser gyroscopes may be packaged with their sensing axes mutually orthogonal in one thermally stable block. For each sensing axis there is a gas-filled conduit or ring usually disposed in a plane at right angles to the sensing axis for that ring. Each conduit comprises three or more linear legs that preferably (but not necessarily) are of equal length. Each conduit is filled with a gain medium that is typically pumped by a gas ion flow between appropriately positioned electrodes. Each gain medium produces two beams traveling in opposite directions in a closed path in the conduit. Mirrors located at the conduit corners direct the beams around the conduit. Frequencies in the beams for which the optical path length around the conduit equals an integral number of wavelengths are amplified, forming standing waves.

To alleviate the problems of using three separate ring laser gyroscopes to sense rotations about three mutually orthogonal axes, several attempts have been made to construct a ring laser gyro system containing three ring laser gyroscopes in a single block.

U.S. Pat. No. 4,407,583 to Simms discloses a triaxial ring laser gyroscope. Three four-cornered conduits arranged in mutually orthogonal planes at right angles to their respective sensitive axes. Each conduit shares a corner with each of the other conduits such that the conduits are interconnected. This structure uses six mirrors to define the three four cornered conduits.

The three conduits can be machined from a block of material. A cube is a very convenient shape for this purpose. The conduits can be located accurately in mutually orthogonal planes. To energize the gas in the three ring laser conduits, six anodes and a common external cathode are used.

The U.S. Pat. No. 4,477,188 to Stiles is a three axes ring laser gyroscope which uses either one or two external cathodes.

U.S. Pat. No. 3,503,688 to Lechevalier teaches a Multiple Axis Laser Angular Rate Sensor wherein the single cathode extends centrally clear through the laser block.

U.S. Pat. No. 4,616,929 to Bernelin teaches a Triaxial Laser Rate Gyro with a single external cathode.

SUMMARY OF THE INVENTION

The present invention provides a more compact three axis ring laser gyroscope which enhances the cathode emission because a much larger cathode cavity volume can be packaged within the laser block than can conveniently be attached to the outside of the block. The position of the cathode is such that it is approximately equi-distant from each of the gain bores.

The invention includes a rigid ring laser block having three sets of conduits therein of four conduits each, connected to form a parallelogram path with six corner mirrors at the intersections of said conduits. Each set of conduits is preferably, but not necessarily, square. The three sets of conduits and their corner mirrors form three mutually orthogonal closed ring laser beam-paths. The planes of the three beam-paths are fixed in the block perpendicular to three defined orthogonal axes. The conduits contain a gain medium, such as a laser gas (typically a helium-neon mixture).

A single cathode is positioned inside the block, preferably near its center, substantially equidistant from three mirrors to which it is in conduit connection. Six anodes are spaced apart and mounted adjacent two non-adjacent conduits of each beam-path. The anode configuration is not critical. The anodes may be imbedded in the block, and they may be concave inwardly or outwardly of the block. If desired, they may extend from the block.

Six ion flow paths are formed between the anodes and the cathode such that application of a suitable electrical potential difference between the anodes and the cathode produces counterpropagating beams in each path.

The cathode in the ring laser gyroscope, according to the present invention, preferably is placed substantially at the geometric center of the laser block, and three conduits extend from the cathode cavity to three of the six corner mirrors.

In a first embodiment of the cathode, a cylindrical cathode bore forms an opening from the outer surface of the block to the region of its geometric center. A hollow sphere or cylinder, formed of an electrically conductive material, is inserted into the cathode bore and comes to rest at its bottom, forming a cathode cavity. A conductor extends outward through the cathode bore to carry electrical potential and current to the cathode. The bore is then sealed.

In a second cathode embodiment, a spherical or cylindrical member formed of a glass-ceramic material, with a layer of an electrically conductive material deposited on the inner surface thereof, is inserted into the cathode bore. A spherical member might be a hemispherical member with the open side free to receive conduits connecting between the cathode surface and three corner mirrors.

In a third cathode embodiment, a bore is formed in the laser block, a layer of an electrically conductive material, preferably of aluminum or a refractory metal, is deposited inside the bore. The metallic layer is oxidized, and the oxide layer thickness is controlled to an predetermined optimal value which depends upon the metal. The oxide thickness, for example, for aluminum may be seven nanometers.

In a fourth cathode embodiment, the cathode bore is cylindrical with a hemispherical inner end. The hemispherical end is coated with the cathode electrode, and the remainder of the cylindrical bore is plugged and sealed. The plug, if it intercepts any of the laser beam-paths, has a laser conduit therein aligned with the laser beam-path. The method of construction of such cathode is to form the cylindrical cathode bore, form the hemispherical inner end, deposit the cathode electrode on the hemispherical portion of the bore surface, form a plug for the bore, drill laser conduits in said plug as necessary, insert the plug, align the laser conduits in the plug with the laser conduit of the block, and seal the plug periphery. To assist in aligning the laser conduits, an alignment mark may be placed on the outer end of the cathode bore plug.

A method according to the present invention for forming a ring laser gyroscope comprises the steps of placing a single cathode at the inside center of the laser block, positioning six anodes outwardly from the cathode, each in conduit connection with a ring laser conduit and spaced apart from each other and from the cathode to form an ion flow path between each anode and the cathode such that application of an electrical potential difference between the anodes and the cathode produces coherent counterpropagating beams in each laser beam-path.

The method of the invention may also include the steps of forming three orthogonal ring laser conduit paths within the laser block, mounting six mirrors at the corners of the paths, mounting to the block six anodes and conduits in the region of non-adjacent branches of each closed path, positioning a cathode in the block with three conduits to three said mirrors, such cathode conduits being symmetrically positioned relative to said two anodes for each path, such that application of an electrical potential difference between the corresponding anodes and the cathode produces counterpropagating beams in each closed beam-path.

One method according to the present invention preferably includes the steps of placing the cathode at the geometric center of the laser block and there forming the cathode to comprise either (1) a hollow sphere or cylinder formed of an electrically conductive material, (2) a sphere or cylinder formed of a glass-ceramic material with a layer of an electrically conductive material deposited on the inner surface of the sphere or cylinder, or (3) a bore formed in the laser block and a layer of an electrically conductive material deposited inside the bore.

It is therefore a feature of this invention to measure angular velocity about three axes.

To do so, it is a feature and object of this invention to use a triaxial ring laser gyro with a cathode surface substantially centrally located in the laser block.

It is an object of this invention not only to provide apparatus for achieving the above-recited objects, but also to provide a method of fabricating such apparatus.

Other objects will become apparent from the following description, taken together with the accompanying drawings.

DESCRIPTION OF THE PREFERRED EMBODIMENT

Referring to the Figures, a triaxial ring laser gyroscope 10 is formed in a block 12 of a material that has a low temperature expansion coefficient. The laser block material is preferably a glass-ceramic composite that is well-known in the art for forming ring laser gyro blocks, and the block is dimensionally stable over a large temperature range.

The triaxial ring laser gyroscope 10 includes three beam-paths that each guide a pair of counterpropagating beams. The planes of the beam-paths, shown diagrammatically in FIGS. 2, 2A, 2B, 2C, are perpendicular to three mutually perpendicular sensing axes 1, 2, and 3 of these figures. Six mirrors 34–39 are mounted onto or into the laser block 12, each at a corner of two-beam-paths and arranged to reflect laser beams traveling in those different beam-paths.

A cathode bore 14 is drilled into the center of the block 12. A cathode 16 is placed in cathode bore 14 and is preferably placed at substantially the geometric center of the block 12. Three passages 18–20 are formed between the cathode cavity and three of the corner mirrors. 34, 36, 38.

Each ion flow path includes a part of a beam path, and that part is called a gain bore. It also includes connecting conduit between the gain bore and one anode and connecting conduit between the gain bore and the cathode. A corner mirror may be in the ion flow path.

Figure 1:
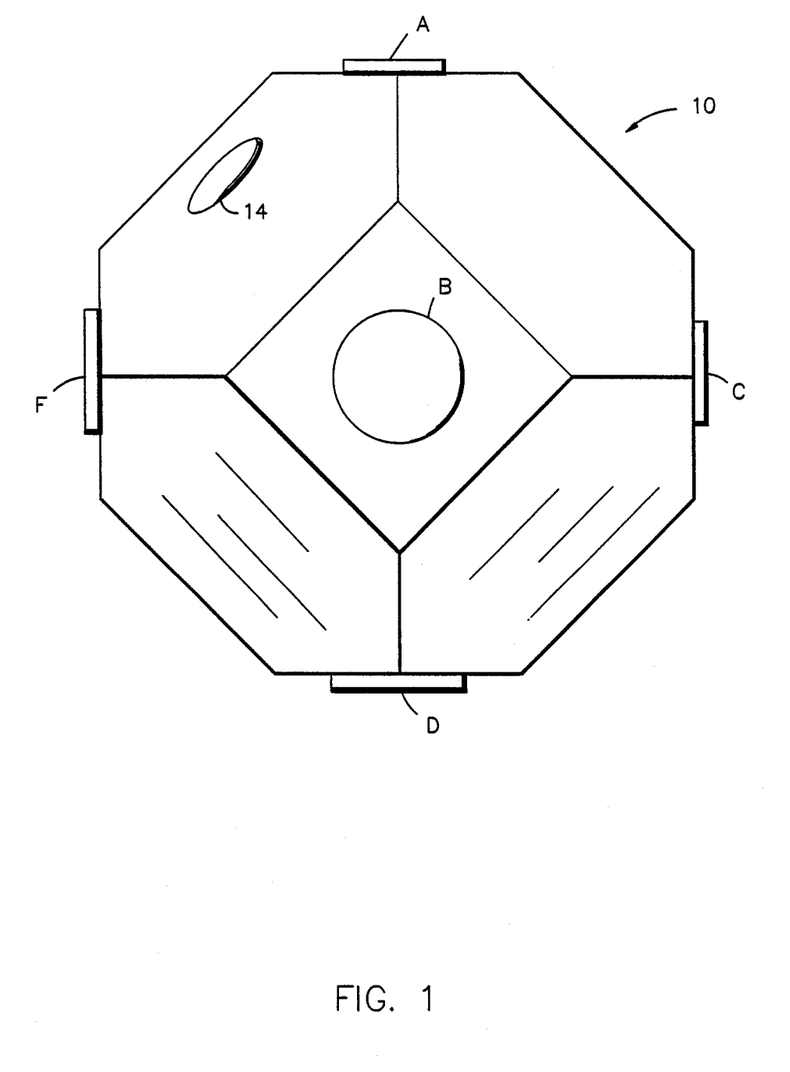
FIG. 1 is an isometric view of the outside of the laser block of a triaxial ring laser gyroscope according to the invention.
Figure 2:
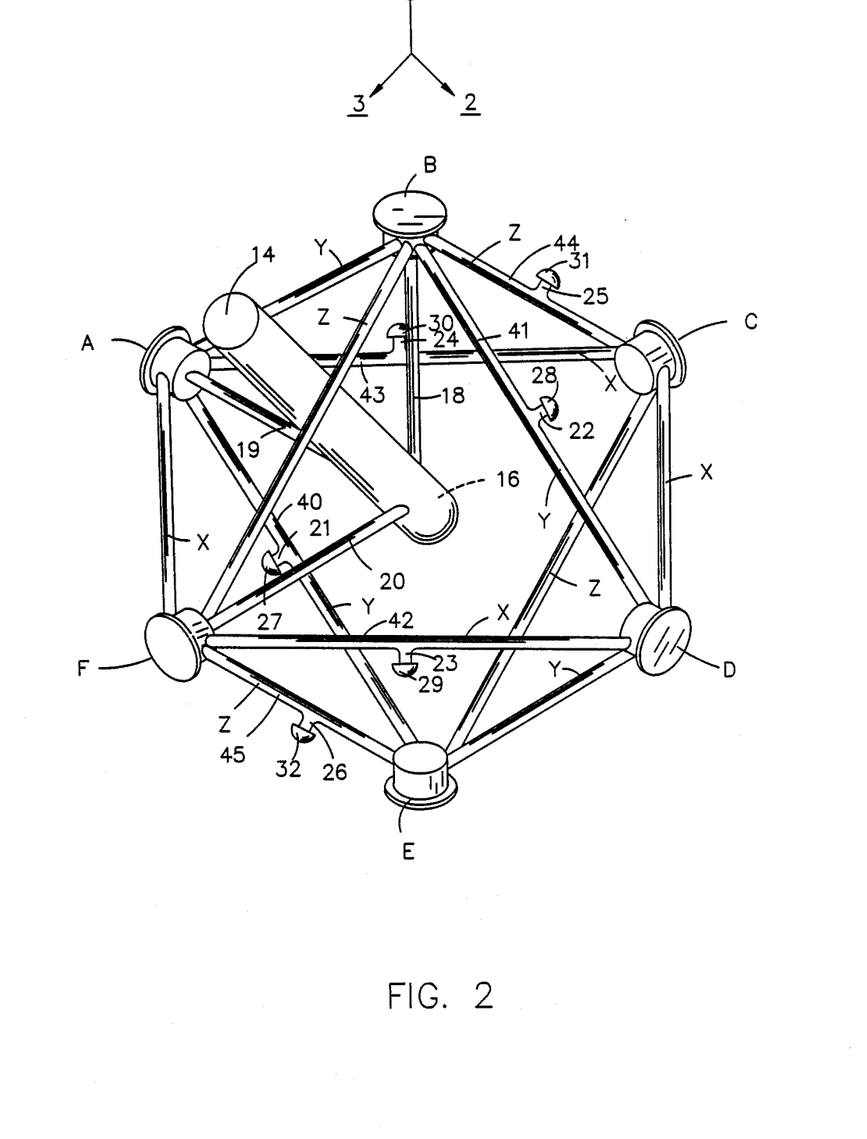
FIG. 2 is a schematic view of the mirrors, conduits, anodes and cathode of the triaxial ring laser of this invention.
Figure 2A:
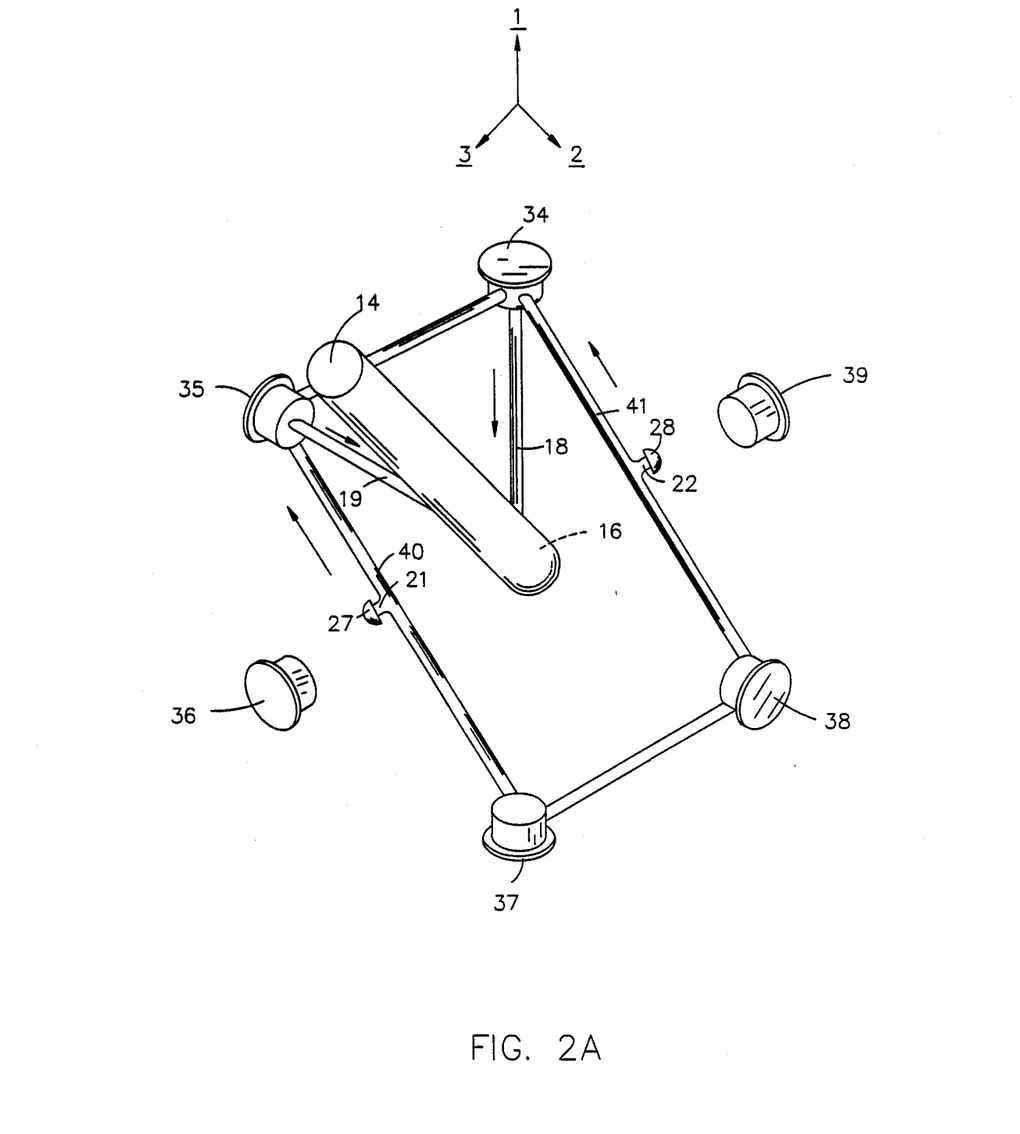
FIG. 2A is identical to FIG. 2 but showing only a first conduit set which contains a first beam-path.

One laser beam path, in the corner mirror sequence 34, 35, 37, 38, is shown in FIG. 2A.

One ion flow path is from the anode 31, through the conduit 21, through the gain bore portion 40, to the mirror 34, and through the conduit 18 to the cathode 16.

A second ion flow path a is from the anode 28, through the conduit 22, through the gain bore portion 41, to the mirror 38, and through the conduit 19 to the cathode 16.

Figure 2B:
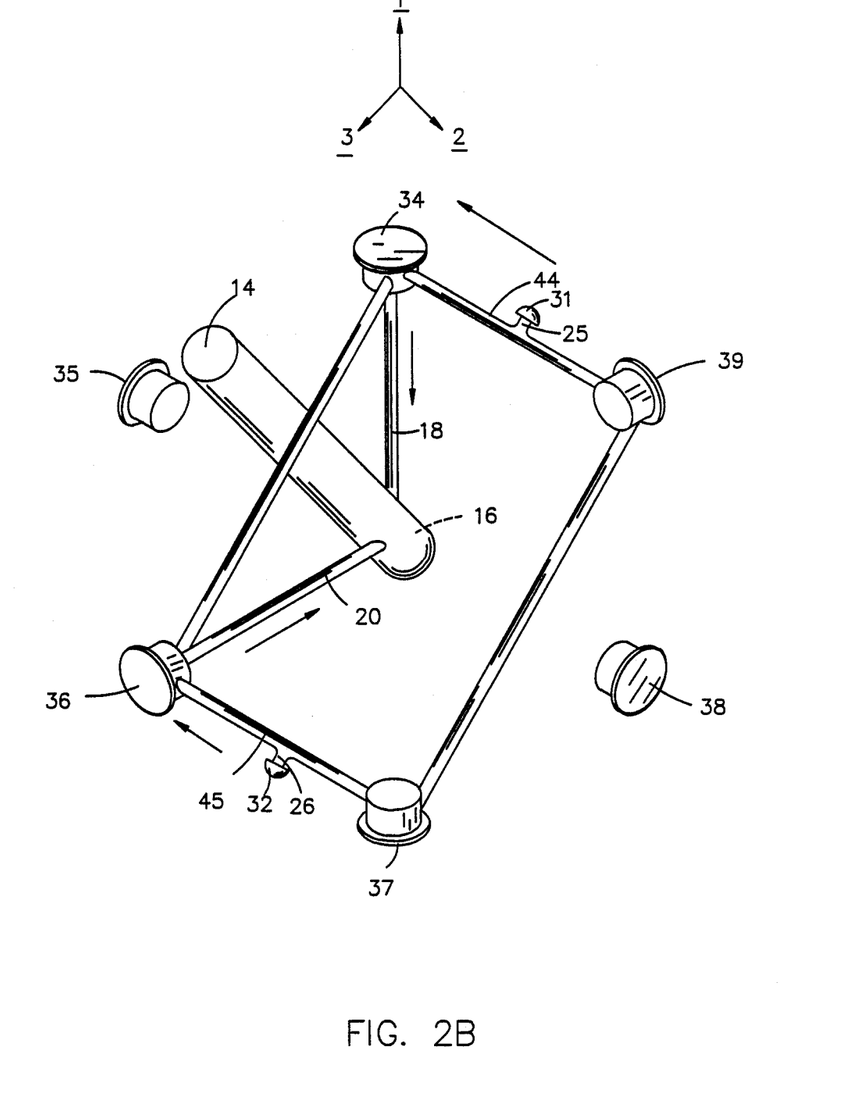
FIG. 2B is identical to FIG. 2 but showing only a second conduit set which contains a second beam-path.

A second laser beam path, in the corner mirror sequence 34, 39, 37, 36, is shown in FIG. 2B.

A third ion flow path is from the anode 31, through the conduit 25, through the gain bore portion 44, to the mirror 34, and through the conduit 18 to the cathode 16.

A fourth ion flow path is from the anode 32, through the conduit 26, through the gain bore portion 45, to the mirror 36, and through the conduit 20 to the cathode 16.

Figure 2C:
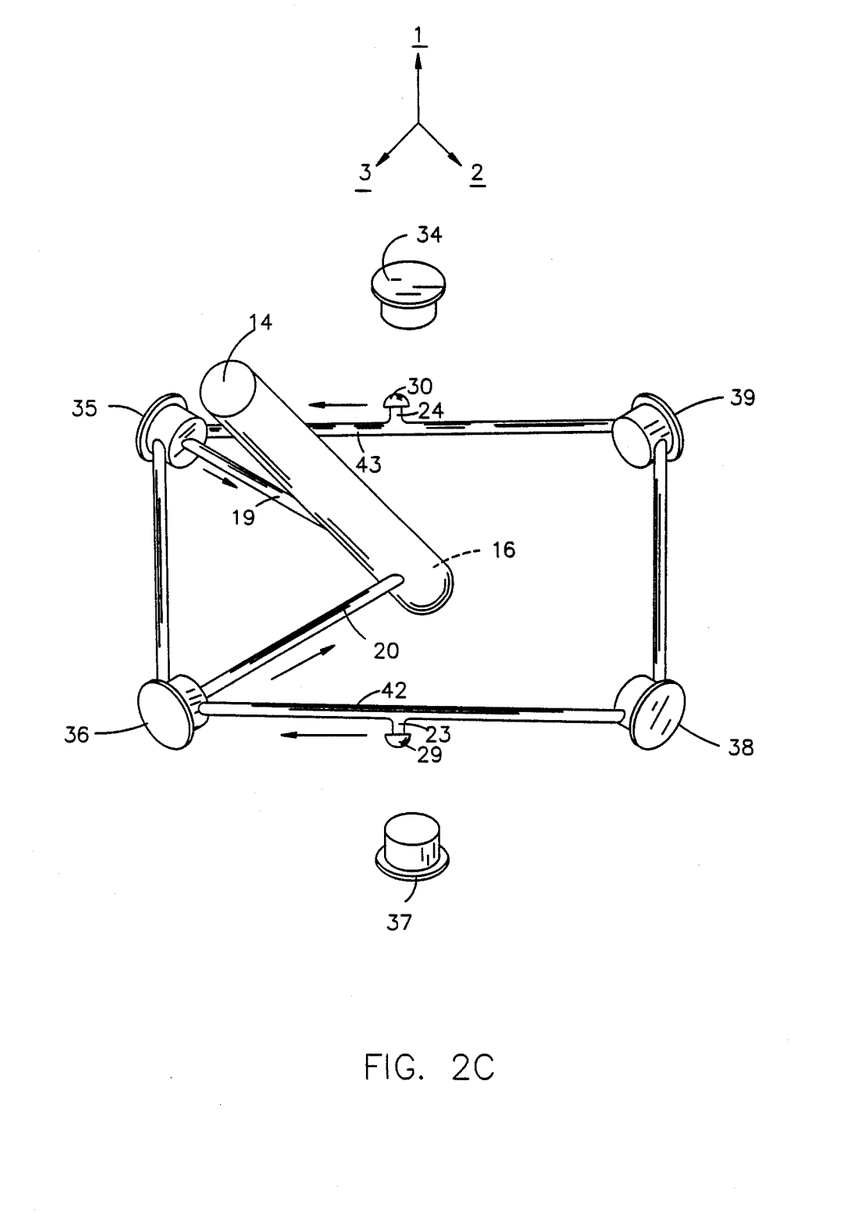
FIG. 2C is identical to FIG. 2 but showing only a third conduit set which contains a third beam-path.

A third laser beam path, in the corner mirror sequence 36, 35, 39, 38, is shown in FIG. 2C.

A fifth flow path is from the anode 29, through the conduit 23, through the gain bore portion 42, to the mirror 38, and through the conduit 19 to the cathode 16.

A sixth ion flow path is from the anode 30, through the conduit 24, through the gain bore portion 43, to the mirror 36, and through the conduit 20 to the cathode 16.

A source of electrical potential difference (not shown) is connected between each anode 27–32 and the cathode 16. Since the anodes 27–32 are at boundaries of the laser block, anode connections may be made in a conventional manner. An electrical connection to the cathode 16 may be made by passing a conductor through the cathode bore 14 to the cathode.

FIG. 2 shows the beam-paths of the internal cathode common mirror triaxial ring laser gyro. FIGS. 2A, 2B, 2C show, respectively, the three beam-paths of the apparatus of the invention, together with their anodes 30–32 and the cathode. The ion flow path between each anode and the cathode includes two gain bores in each beam-path where the gain medium is excited to produce the counterpropagating beams that are characteristic of the ring laser.

Langmuir flow is the flow of gas caused by interaction of moving ions in a gas. The arrows next to the gain bores in FIGS. 2, 2A, 2B, 2C show the direction of flow of ions. By having the two ion flows in a given beam-path in opposite directions, Langmuir flow around such path is cancelled. This, in turn, cancels any Fresnel-Fizeau drag effects.

The new design is more compact than prior art triaxial ring laser gyro structures. To reduce the liklihood of anode-to-anode ion flow, the distance between anodes is greater than the distance from each anode to the cathode.

The cathode may be formed by several techniques and in several configurations.

In a first cathode embodiment, a cathode bore 14 is formed in th laser block 12, and a hollow aluminum sphere or cylinder (not shown) is placed in the bottom of the bore 14 and substantially at the center of the laser block 12. A conductor leads from the cathode, through the cathode bore 14 and out of the laser block. The cathode bore is plugged before the cathode bore is filled with laser gas.

Figure 5:
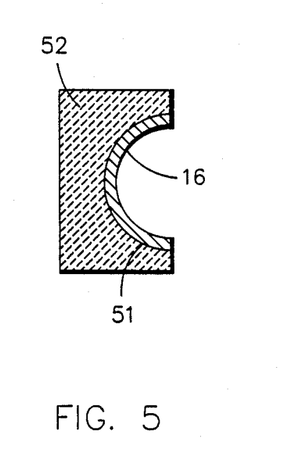
FIG. 5 is a sectional view of a preferred cathode according to the invention.

In a second cathode embodiment, a cathode bore 14 formed in the laser block, and a cathode structure is formed by vapor deposition of a metal 506 such as aluminum onto a spherical or cylindrical surface 51 of a substrate material 52 which may be the same material as the laser block 12. The deposited cathode 16 and its substrate 52 are then inserted into the cathode bore 14. A conductor 54 may also be deposited along the inside of the cathode bore 14 leading to the outside of the laser block. The cathode bore 14 is plugged by a plug 56 before the cathode bore 14 is filled with laser gas.

Figure 4:
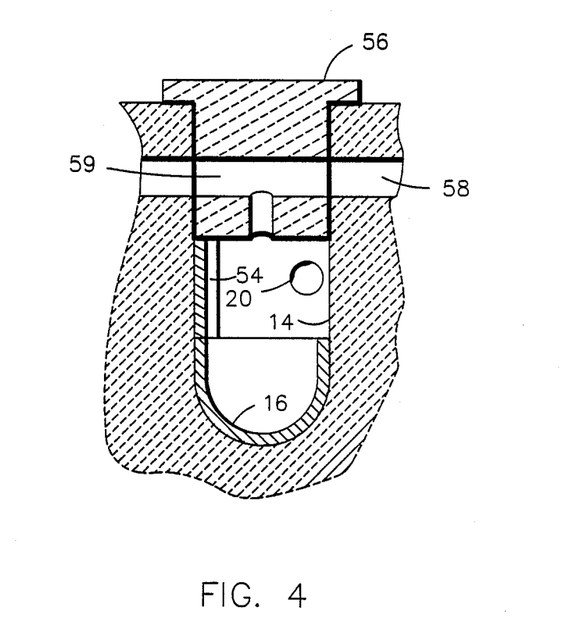
FIG. 4 is a view, partly in section, taken at 4—4 in FIG. 3.

In a third cathode embodiment, shown specifically in FIG. 4, the cathode bore 14 may be shaped into the desired shape of the cathode, and the cathode 16 may be formed by deposition of a metal such as aluminum directly into the bore 14 to form the cathode 16, and the lead-out conductor 54 may also be deposited on the surface of the bore 14. The cathode bore is plugged by plug 56 before the laser gas is inserted.

Figure 3:
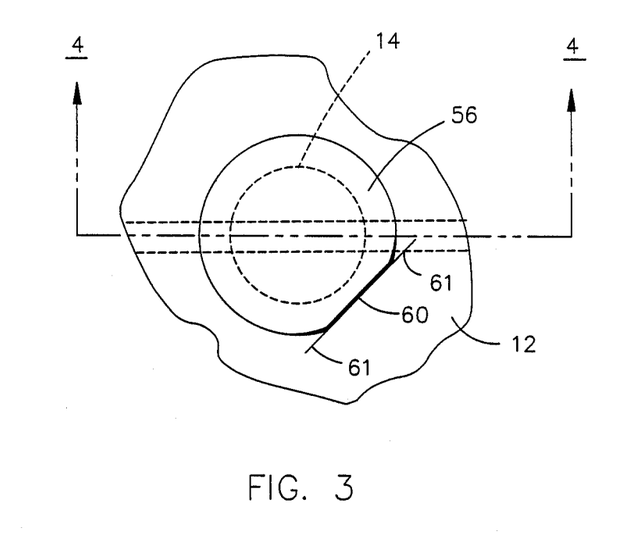
FIG. 3 is a top view of the cathode bore plug of one embodiment of the cathode of this invention.

In each of the cathode embodiments, the cathode bore might intercept a beam-conduit 58. If it does, the cathode bore plug 56 has a beam-conduit 59 therethrough that is aligned and matched with the beam-conduit 58. The conduit 59 may be aligned with the conduit 59 by an alignment mark on the outside of the block 12. For example, as shown in FIG. 3, The top of the plug 56 has a flat portion 60 thereon which, when aligned with bench marks 61, align the conduit 59 with the conduit 58.

The beam-paths are described herein as parallelograms. Preferably they are squares.

In the preferred embodiment of the laser block, the mirrors are not merely oriented as if they were on a parallelopiped, but they are actually on or embedded in the faces of a parallelopiped. Even more preferably, they are on or embedded in the faces of a cube.

Although the invention has been described with reference to a specific preferred embodiment, the scope of the invention is not limited to this specific structure, which is exemplary of the invention rather than limiting. The scope of the invention is defined by the appended claims and reasonable equivalents thereof.

What is claimed is:

1. A ring laser gyroscope including a laser block having twelve conduits therein and six corner mirrors for defining three orthogonal closed laser beam-paths for guiding counterpropagating laser beams, each laser beam-path having a gain medium therein and being configured and positioned to define a sensing axis for detection of rotations of the laser block, a cathode, six anodes mounted to the laser block, two in conduit communication with each of said beam-paths, and spaced apart from said cathode, comprising:

said single cathode positioned substantially in the center of said laser block;

at least three conduits of substantially equal length between said cathode and said beam-paths, two to each beam-path, to form substantially equal length ion flow paths between each anode and said cathode such that application of substantially electrical positive potential, relative to said cathode, to said anodes produces substantially equal ion flows in opposite directions in each of said beam-paths to produce coherent counterpropagating laser beams in each said laser beam-path whereby said cathode position restrains said conduit and ion flow lengths to be substantially equal.

2. The ring laser gyroscope of claim 1 wherein said laser block is in the shape of a parallelopiped, each of said laser beam-paths includes four conduits that are arranged in a parallelogram with said corner mirrors at the intersection of said conduits so that each laser beam path intersects another said laser beam-path.

3. The ring laser gyroscope of claim 2 wherein the cathode comprises a hollow member formed of an electrically conductive material.

4. The ring laser gyroscope of claim 3 wherein the cathode has a spherical shape.

5. The ring laser gyroscope of claim 3 wherein the cathode has a cylindrical surface.

6. The ring laser gyroscope of claim 3 wherein the cathode comprises a member formed of a glass-ceramic material and a layer of an electrically conductive material deposited on the inner surface of said member.

7. The ring laser gyroscope of claim 3 wherein the cathode comprises a cathode bore formed in the laser block and a layer of an electrically conductive material deposited inside at least a portion of the bore.

8. The ring laser gyroscope of claim 7 and further comprising a sealed plug in said bore to seal it off, and said cathode bore filled with laser gas.

9. The ring laser gyroscope of claim 8 wherein said cathode bore plug intercepts at least one of said laser conduits, and at least one laser conduit is formed through said plug and aligned with said intercepted conduits.

10. The ring laser gyroscope of claim 8 wherein said cathode bore plug intercepts at least one of said laser conduits, and at least one laser conduit is formed through said plug and aligned with said intercepted conduits.

11. The ring laser gyroscope of claim 3 and further comprising a sealed plug in said bore to seal it off, and said cathode bore filled with laser gas.

12. Apparatus as recited in claim 2 wherein said parallelopiped is a cube.

13. A method for forming a triaxial ring laser gyroscope in a solid dimensionally stable laser block having six faces which are positioned as on the faces of a parallelopiped, comprising:
   forming twelve laser conduits between said faces;
   positioning and sealing six laser mirrors at said faces and intercepting said conduits to form three mutually orthogonal closed beam-paths;
   forming a cathode bore into substantially the center of the region of said faces of said laser block;
   placing a cathode in said bore at substantially the center of said block;
   forming three substantially identical gas conduits between said cathode and said laser conduits at three of said mirrors;
   forming, placing and sealing a plug in said bore;
   positioning six anodes adjacent six of said laser conduits of substantially equal lengths, two in non-adjacent conduits of each of said closed beam-paths, and including six gas conduits between said anodes and their adjacent said laser conduits; and
   filling said conduits and said bore with laser gas to form six ion flow paths of substantially equal length between said anodes and said cathode, including two gain bores having oppositely directed ion flow in each beam-path; whereby said cathode position restrains said conduit and ion flow lengths to be substantially equal.

14. The method of claim 13 in which said cathode is formed and inserted into said cathode bore.

15. The method of claim 13 wherein said cathode is formed on the surface of said cathode bore.

16. The method of claim 13 and further comprising rounding the inner end of said cathode bore into a hemisphere, and forming a cathode surface on the hemispherical surface of said bore.

17. The method of claim 13 including the step of forming the cathode to comprise a hollow sphere formed of an electrically conductive material.

18. The method of claim 17 including the step of forming the cathode to comprise a sphere formed of a glass-ceramic material and a layer of an electrically conductive material deposited on the inner surface of the sphere.

19. The method of claim 13 including the step of forming the cathode to comprise a hollow cylinder formed of an electrically conductive material.

20. The method of claim 19 including the step of forming the cathode to comprise a cylinder formed of a glass-ceramic material and a layer of an electrically conductive material deposited on the inner surface of the cylinder.

* * * * *